8335X
H. Bartlett,
Cook Stove.
Patented Aug: 1. 1834.
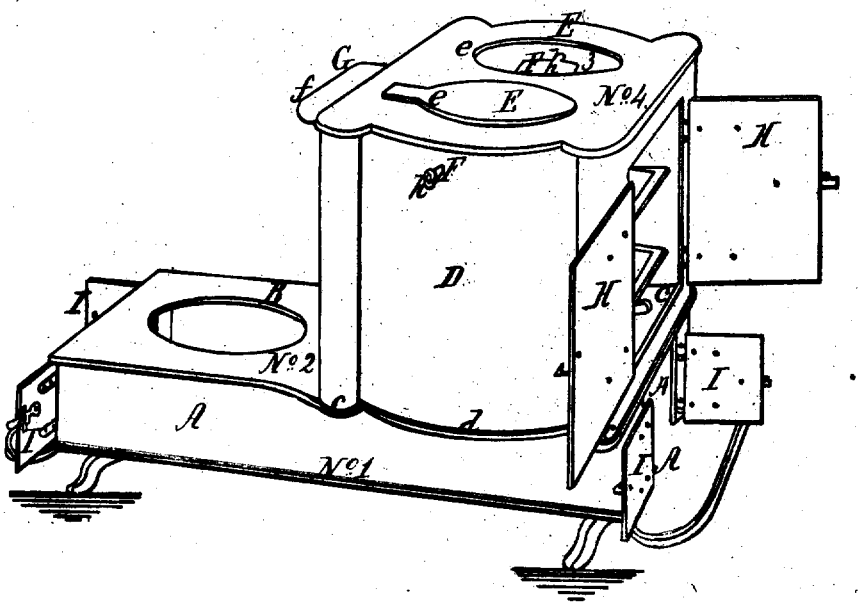

Aug. 1. 1834 57

Horace Bartlett, Carmel New York

Letters Patent.

The Schedule referred to in these Letters Patent and making
part of the same containing a description in the words of the said
Horace Bartlett, himself, of his improvement in the cooking stove To all to whom these presents shall come
Be it known that I, Horace Bartlett, of Carmel, in the County
of Putnam and State of New York, have invented a new & useful
improvement in the form and construction of my present patent-
ed cooking stove, and that the following is a full and exact de-
scription of the construction and operation of the said cooking stove
as invented or improved by me. The bed for the fire lies across
the stove from front, to rear, see plate No 1, letter a. A plate forming
the remaining part of the bottom, turning in a horizontal form
from the top of this bed to the full length of the stove; which, for
the sake of description, I call the wings see plate No 1. Plate No 2, forms
the bottom of the oven, over the bed for the fire or plate No 1. in
Between these plates the blaze is cramped suddenly off, forming
thereby a more powerful draft. Thro' this plate, in the bottom of the
oven, and back of the main body of the stove, are holes for boilers
plate No 2 letter b at each corner of this plate, is a hole for the smoke,
over which stands a pipe, in the form of a half circle, letter c. Between
these pipes, connected with them in a circular form, is a piece forming
the end of the stove. Facing these pipes is a piece forming the length of
the oven, leaving an opening for the smoke, letter d. Upon the top of
these pipes is a plate forming the top of the oven, plate No 3. over
this is another, raised 4 inches, forming what I call the dome in
plate No 4: through which, at each end, is a hole for boilers, letter e.
From the back part of this dome extends the pipe letter f. through
the bottom plate of the dome, which forms the top of the oven,
is

372 is a whole letter g. this conveys the steam into the drum, when boiling: when baking, this is closed by a damper on the under side of the plate, between these plates i.e. the inside of the drum, are the dampers, see letter k, plate No. 3. doors opening from the centre. What I claim as an improvement, is extending the bed for the fire, back of the main body of the stove.

What I claim as new, and a useful invention to community, is, extending the bed for the fire so far back, that it receives long wood, and only about one half of it is burning at a time, unless the draft door is opened at the back end, which may be done, when more heat is required thus putting in long wood, leaving it perfectly under the control of its manager, consuming no more than what is required for immediate use; thereby saving the expense of cutting the wood into short pieces; acting something on the principle of burning coal from the base; but this being in a horizontal form, I believe to be new and never before used to my knowledge, when applied to wood for a cooking stove.

Witnesses
Henry Hanford
David H. Kiele

Horace Bartlett

Exd.
M.G.C.

[624 NO